United States Patent [19]
Tanuma et al.

[11] Patent Number: 5,196,994
[45] Date of Patent: Mar. 23, 1993

[54] CARD TYPE INTEGRATED CIRCUIT AND RESPECTIVE 8/16-BIT CARD CONNECTOR

[75] Inventors: Jiro Tanuma; Hideaki Ishimizu; Takao Uchida, all of Tokyo, Japan

[73] Assignee: Oki Electric Industry Co., Ltd., Tokyo, Japan

[21] Appl. No.: 584,597

[22] Filed: Sep. 19, 1990

[30] Foreign Application Priority Data

Sep. 21, 1989 [JP] Japan .................................. 1-109653

[51] Int. Cl.⁵ .............................................. H05K 1/14
[52] U.S. Cl. .................................. 361/395; 235/492; 439/60; 439/65; 361/392
[58] Field of Search ................ 174/253, 261; 235/380, 235/492; 361/392, 393, 394, 395, 399, 400, 409; 439/59, 924

[56] References Cited

U.S. PATENT DOCUMENTS

| | | | |
|---|---|---|---|
| 3,702,464 | 11/1972 | Castrucci | 357/74 F |
| 4,869,672 | 9/1989 | Andrews, Jr. | 439/60 |
| 5,061,190 | 10/1991 | Medeiors et al. | 439/60 |
| 5,071,371 | 12/1991 | Harwath et al. | 439/60 |

FOREIGN PATENT DOCUMENTS

| | | |
|---|---|---|
| 0195865 | 10/1986 | European Pat. Off. . |
| 0275091 | 7/1988 | European Pat. Off. . |
| 2359464 | 2/1978 | France . |
| 125686 | 5/1989 | Japan . |
| 0288175 | 11/1990 | Japan .................................... 439/65 |
| 2021823A | 12/1979 | United Kingdom . |

OTHER PUBLICATIONS

Patent Abstracts of Japan, vol. 13, No. 368 (P-919) 16 Aug. 1989 & JP-A-1 125 686 (Oki Electric) 18 May 1989, Abstract.

*Primary Examiner*—Leo P. Picard
*Assistant Examiner*—Donald Sparks
*Attorney, Agent, or Firm*—Spencer, Frank & Schneider

[57] ABSTRACT

A card type integrated circuit device is provided with a terminal arrangement for adapting the device to both 8 bit and 16 bit external systems. The arrangement includes a central terminal array wherein terminals for carrying signals common to both 8 bit and 16 bit systems are disposed, and an end terminal array wherein terminals for carrying signals exclusive to a 16 bit system are disposed.

5 Claims, 8 Drawing Sheets

FIG. 1

| No. | 8-BIT BUS | | No. | 16-BIT BUS | |
|---|---|---|---|---|---|
| 1 | N.C | UNUSED | 1 | GND | GROUND |
| 2 | N.C | UNUSED | 2 | D11 | I/O 11 |
| 3 | N.C | UNUSED | 3 | D10 | I/O 10 |
| 4 | N.C | UNUSED | 4 | D9 | I/O 9 |
| 5 | N.C | UNUSED | 5 | D8 | I/O 8 |
| 6 | CD | FOR DETECTING A CARD | 6 | CD | FOR DETECTING A CARD |
| 7 | OE | OUTPUT ENABLE | 7 | OE1 | OUTPUT ENABLE 1 |
| 8 | N.C | UNUSED | 8 | OE2 | OUTPUT ENABLE 2 |
| 9 | A19 | A19 | 9 | A19 | A19 |
| 10 | A18 | A18 | 10 | A18 | A18 |
| 11 | A17 | A17 | 11 | A17 | A17 |
| 12 | A16 | A16 | 12 | A16 | A16 |
| 13 | A15 | A15 | 13 | A15 | A15 |
| 14 | A14 | A14 | 14 | A14 | A14 |
| 15 | A13 | A13 | 15 | A13 | A13 |
| 16 | A12 | A12 | 16 | A12 | A12 |
| 17 | A11 | A11 | 17 | A11 | A11 |
| 18 | A10 | A10 | 18 | A10 | A10 |
| 19 | A9 | A9 | 19 | A9 | A9 |
| 20 | A8 | A8 | 20 | A8 | A8 |
| 21 | A7 | A7 | 21 | A7 | A7 |
| 22 | A6 | A6 | 22 | A6 | A6 |
| 23 | A5 | A5 | 23 | A5 | A5 |
| 24 | VCC | +5V | 24 | VCC | +5V |
| 25 | CE | CHIP ENABLE | 25 | CE | CHIP ENABLE |
| 26 | A4 | A4 | 26 | A4 | A4 |
| 27 | A3 | A3 | 27 | A3 | A3 |
| 28 | A2 | A2 | 28 | A2 | A2 |
| 29 | A1 | A1 | 29 | A1 | A1 |
| 30 | A0 | A0 | 30 | A0 | A0 |
| 31 | D7 | I/O 7 | 31 | D7 | I/O 7 |
| 32 | D6 | I/O 6 | 32 | D6 | I/O 6 |
| 33 | D5 | I/O 5 | 33 | D5 | I/O 5 |
| 34 | D4 | I/O 4 | 34 | D4 | I/O 4 |
| 35 | D3 | I/O 3 | 35 | D3 | I/O 3 |
| 36 | D2 | I/O 2 | 36 | D2 | I/O 2 |
| 37 | D1 | I/O 1 | 37 | D1 | I/O 1 |
| 38 | D0 | I/O 0 | 38 | D0 | I/O 0 |
| 39 | WP | WRITE PROTECT | 39 | WP | WRITE PROTECT |
| 40 | VBB | BATTERY VOLTAGE | 40 | VBB | BATTERY VOLTAGE |
| 41 | WE | WRITE ENABLE | 41 | WE1 | WRITE ENABLE 1 |
| 42 | N.C | UNUSED | 42 | WE2 | WRITE ENABLE 2 |
| 43 | GND | GROUND | 43 | GND | GROUND |
| 44 | N.C | UNUSED | 44 | D15 | I/O 15 |
| 45 | N.C | UNUSED | 45 | D14 | I/O 14 |
| 46 | N.C | UNUSED | 46 | D13 | I/O 13 |
| 47 | N.C | UNUSED | 47 | D12 | I/O 12 |
| 48 | N.C | UNUSED | 48 | VCC | +5V |

8-BIT SYSTEM CARD

16-BIT SYSTEM CARD

CONNECTOR EXCLUSIVE
FOR 8-BIT SYSTEM CARD

CONNECTOR COMMON TO
8-BIT/16-BIT SYSTEM CARDS

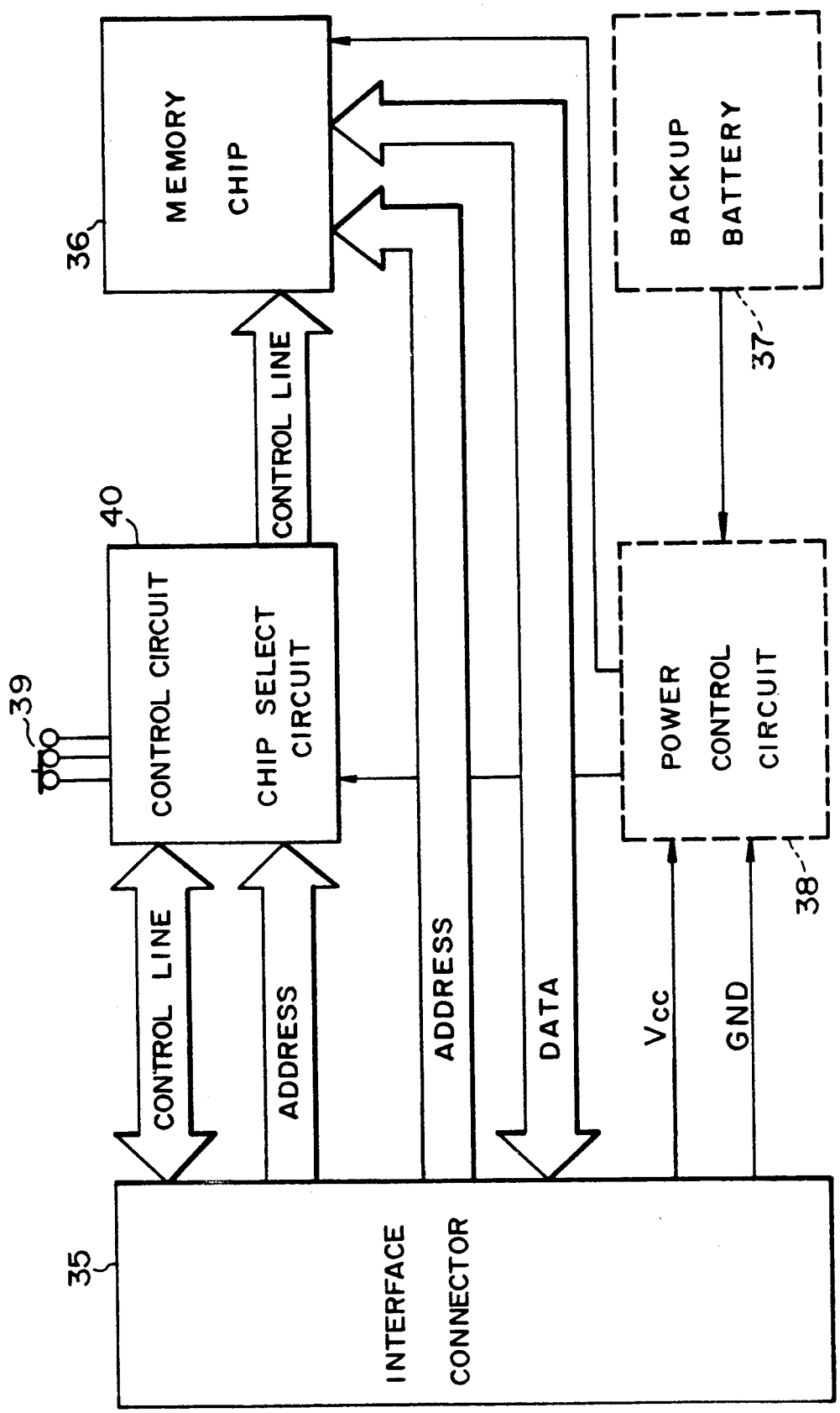

FIG. 10
PRIOR ART

| # | SINGLE ROW (8-BIT) | | # | DOUBLE ROW (16-BIT) | |
|---|---|---|---|---|---|
| 01 | GND | GND | 35 | GND | GND |
| 02 | D3 | I/O3 | 36 | $\overline{CD1}$ | <FOR DETECTING A CARD> |
| 03 | D4 | I/O4 | 37 | D11 | I/O 11 |
| 04 | D5 | I/O5 | 38 | D12 | I/O 12 |
| 05 | D6 | I/O6 | 39 | D13 | I/O 13 |
| 06 | D7 | I/O7 | 40 | D14 | I/O 14 |
| 07 | $\overline{CE}$ | $\overline{CE/CS1}$ | 41 | D15 | I/O 15 |
| 08 | $\overline{A10}$ | A10 | 42 | $\overline{CE2}$ | UPPER BYTE |
| 09 | $\overline{OE}$ | $\overline{OE}$ | 43 | | |
| 10 | A11 | A11 | 44 | | |
| 11 | A9 | A9 | 45 | | |
| 12 | A8 | A8 | 46 | A17 | A17 |
| 13 | A13 | A13 | 47 | A18 | A18 |
| 14 | A14 | A14 | 48 | A19 | A19 |
| 15 | $\overline{WE/PGM}$ | $\overline{WE/PGM}$ | 49 | A20 | A20 |
| 16 | RDY/BSY | Vcc RDY/BSY(FOR EEPROM) | 50 | A21 | A21 |
| 17 | Vcc | Vcc | 51 | Vcc | Vcc |
| 18 | Vpp1/Vcc | Vpp1/Vcc | 52 | Vpp2/Vcc | Vpp2/Vcc |
| 19 | A16 | A16 | 53 | A22 | A22 |
| 20 | A15 | A15 | 54 | A23 | A23 |
| 21 | A12 | A12 | 55 | | |
| 22 | A7 | A7 | 56 | | |
| 23 | A6 | A6 | 57 | | |
| 24 | A5 | A5 | 58 | | |
| 25 | A4 | A4 | 59 | | |
| 26 | A3 | A3 | 60 | | |
| 27 | A2 | A2 | 61 | | |
| 28 | A1 | A1 | 62 | | |
| 29 | A0 | A0 | 63 | | |
| 30 | D0 | I/O 0 | 64 | D8 | I/O 8 |
| 31 | D1 | I/O 1 | 65 | D9 | I/O 9 |
| 32 | D2 | I/O 2 | 66 | D10 | I/O 10 |
| 33 | $\overline{WP}$ | WRITE PROTECT | 67 | $\overline{CD2}$ | CARD DETECTION |
| 34 | GND | GND | 68 | GND | GND |

# CARD TYPE INTEGRATED CIRCUIT AND RESPECTIVE 8/16-BIT CARD CONNECTOR

BACKGROUND OF THE INVENTION

1. Field of the Invention

The present invention relates to a card type integrated circuit in the size of a name card which can be used by connecting it to a personal computer, a printer, etc. and stores various memory contents, and a connector used for the integrated circuit.

2. Background Information

A card type integrated circuit comprises a substrate loaded with circuit devices, a frame, a cover, etc. that are assembled into a solid body, so-called an IC card (Integrated Circuit Card). Since the card type integrated circuit can be provided with various functions by selecting the circuit devices loaded thereon and is easily carried, with expectations for wide application, the integrated circuit has already been put to practical use in every field of the industry.

When the card type integrated circuit been with a large storage capacity in which programs and data for electronic equipment are stored is connected to the electronic equipment through connectors, it becomes possible, for example, to add new functions to the electronic equipment or to store various types of fonts in the memory to cause a printer to select a desired font for printing.

Structures of a card type integrated circuit and a connector to be electrically connected to the card type integrated circuit such as described above have been proposed. For example, there is a disclosure in the Japanese Patent Laid-Open Publication No. 125686/1989.

In the card type integrated circuit, a terminal section to be electrically connected to a connector is arranged on the end portion of a substrate, while circuit devices, such as a memory, etc. are loaded on the center portion thereof. On the rear face of the substrate, there is arranged a frame for reinforcing the substrate and the circuit devices. The circuit devices are housed in a recess hole provided on the frame. On the back of the frame there is provided a back cover. The surface of the substrate, except the terminal section, is coated with an insulating film. Further, on the film coated surface there is provided a metallic surface cover.

On the other hand, in the connector a guide section for inserting the card type integrated circuit and a housing section are integrally formed. In the housing section there are arranged contact pins in a position associated with terminals of the card type integrated circuit. On the guide section there is provided a guide protrusion. When the card type integrated circuit is inserted into the connector receiving sections provided on both end portions of the surface cover of the card type integrated circuit, with a leaf spring interposed therebetween, are pushed upward by the guide protrusion. Thereby, the surface cover is pushed upward to expose the terminal section of the substrate so that the contact pins on the connector contact the terminal section. In this way, electrical connection between the card type integrated circuit and the connector is completed.

A card type integrated circuit and a connector connected to the card type integrated circuit, such as described above, have been developed in two types; a ROM type card and a RAM type card. These are divided into an 8-bit system I/O bus type the and 16-bit system I/O bus depending on the configuration of a control section of the main body which uses the card type integrated circuit.

In a general card type integrated circuit employing an online bus system, there is provided an interface connector, i.e. a two-piece connector, for connecting equipment on the side to be connected to the card type integrated circuit and a data processor. Connected to the interface connector are memory chips, such as a RAM, a one-time PROM, a mask ROM, etc.

In such an online bus system, the card type integrated circuit is provided with 34 terminals arrayed in an 8-bit system card or 56 terminals arrayed in a 16-bit system card. The 8-bit system card uses a connector having 34 poles in a single row pin, while the 16-bit system card requires a connector having 68 poles in a double row pin. Therefore, there is no compatibility between the different cards.

Consequently, in addition to a connector used for the 8-bit system card, another connector to be used for the 16-bit system card is needed in the same equipment, which has given rise to a problem of a remarkable increase in the cost.

SUMMARY OF THE INVENTION

It is therefore an object of the present invention to provide a card type integrated circuit which is insured by a common feature and a compatibility between an 8-bit system card and a 16-bit system card and does not cause the cost increase in the case of using the 16-bit card on the same equipment.

In order to attain the object described above, according to the present invention, a card type integrated circuit for an 8-bit system and a 16-bit system includes one or more circuit devices loaded on a substrate and a terminal array having plurality a of terminals connected to the circuit devices through an I/O bus system to input and output data from and to external equipment.

According to the present invention, a connector comprises a guide section provided with a guide groove for receiving the card type integrated circuit and a housing section provided with contact pins for connecting to the terminal array of the card type integrated circuit. In the layout and assignment of the terminals of the card type integrated circuit and the contact pins of the connector, the terminals for signals common to the 8-bit system card and the 16-bit system card are arranged on the central portion of the terminal array and the other terminals for signals dedicated to the 16-bit system card are arranged on both end portions of the terminal array.

According to the configuration described above, in the card type integrated circuits and the connectors for both 8-bit system and 16-bit system there is no difference in their appearance but only the array of terminals is common to both systems. Thus, the 8-bit system card and the 16-bit system card can be connected with the same connector. In other words, the 8-bit system card can also be connected to the connector for the 16-bit system card, specifically, there is no need of using a connector exclusive for the 8-bit system card and for the 16-bit card on the same equipment.

Further, even in the case of using the connector exclusive for the 8-bit system card, by deleting each five unused terminals exclusive for the 16-bit card from both end portions of the terminal array of the connector, it is possible to achieve stable connection without collapsing the balance of the pressure applied on respective pins at the time of insertion.

BRIEF DESCRIPTION OF THE DRAWINGS

The objects and features of the present invention will become more apparent from the consideration of the following detailed description taken in conjunction with the accompanying drawings in which:

FIG. 1 is a table showing pin assignment on the card type integrated circuits and the connectors in accordance with the present invention;

FIG. 9 is a block diagram demonstrating construction of the card type integrated circuit employing an online bus system; and FIG. 10 is a table showing functions of the online bus system and pin assignment on a prior art card type integrated circuit and a prior art connector.

DESCRIPTION OF THE PREFERRED EMBODIMENTS

Figure 2A:
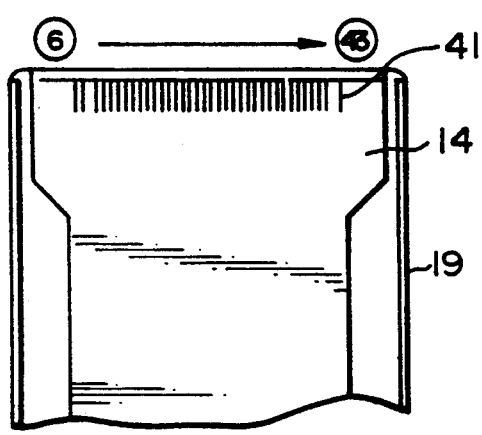
FIGS. 2A and 2B are plan views showing essential portions of the card type integrated circuits in accordance with the present invention.

Illustrative embodiments of the present invention will be described hereunder, making reference to the drawings.

Referring to FIG. 1, there is shown a pin assignment table representative of assignment in terminal arrays on a card type integrated circuit and a connector connected to the card type integrated circuit in accordance with the present invention.

Signals used in the figure will be explained hereunder.

(1) D0-D15; BIDERECTIONAL DATA BUS to be used with only 8 bits from D0 to D7 in a single row connector and with 16 bits from D0 to D15 in a double row connector (2) A0-A23; ADDRESS BUSes (Input) which are directly addressable up to 16 megabytes (3) CE1 and CE2; CHIP ENABLEs (Input) to turn CE1 to a low level at the time of accessing even bytes (D0-D7) and CE2 to a low level at the time of accessing odd bytes (D8-D15)

(4) OE; OUTPUT ENABLE (Input) which is an active low signal used at the time of reading out data (5) WE; WRITE ENABLE (Input) which is an active low signal used at the time of writing data (6) RDY/BSY; READY SIGNAL (Output) to be used in a card type integrated circuit loaded with an EEPROM at the time of writing data and to control writing timing (7) CD1 and CD2; CARD DETECTs (Output) which are card insertion detecting signals located on both ends of a double row connector and capable of detecting whether a card is correctly inserted or not.

(8) WP; WRITE PROTECT (Output) to output a signal indicative of a switch being in a state of write protect (9) Vpp1 and Vpp2; PROGRAM POWER SOURCEs which are power sources for writing data in a one-time ROM, and Vpp1 is used as a power source for writing data in even byte memories (D0-D7) when the data width is a double row containing 16 bits.

(10) Vcc and GND; POWER SOURCE and GROUND whose terminals are arranged on positions symmetrical to each other to insure safetiness even at the time of inserting a card in reverse.

As seen in FIG. 1, in the illustrative embodiment the memory capacity for the 8-bit system card is set to 1 megabyte as the maximum, while the memory capacity for the 16-bit system card is set to 2 megabytes as the maximum.

Signals from A0 to A23 and from D0 to D7 used in common for both 8-bit system card and 16-bit system card are collectively arranged on the center portion of the terminal section. Signals from D8 to D15 used only for the 16-bit system card are divided into halves to be arranged on both end portions of the terminal array, respectively. On the outside portions of the signals from D8 to D15 there are arranged OE1 and WE1. Further, on the positions adjacent to respective OE1 and WE1 there are arranged OE2 and WE2 in an identifiable manner. Finally, Vcc and GND for supplying the power are arranged on the outermost portions.

Card type integrated circuits having terminals consisted of an array as described above and connectors connected to the card type integrated circuits are shown in FIGS. 2A, 2B, 3A, and 3B.

Figure 2B:
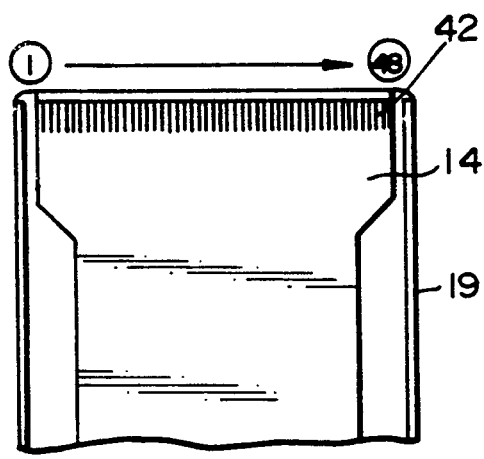
Figure 3A:
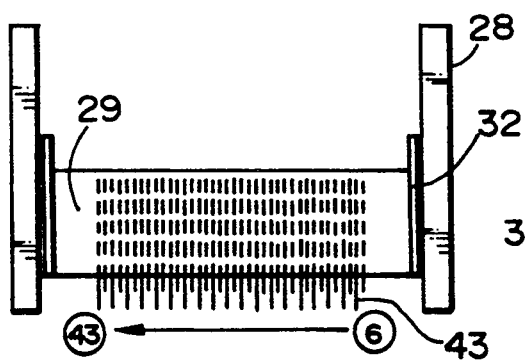
FIGS. 3A and 3B are plan views showing essential portions of the connectors in accordance with the present invention.
Figure 3B:
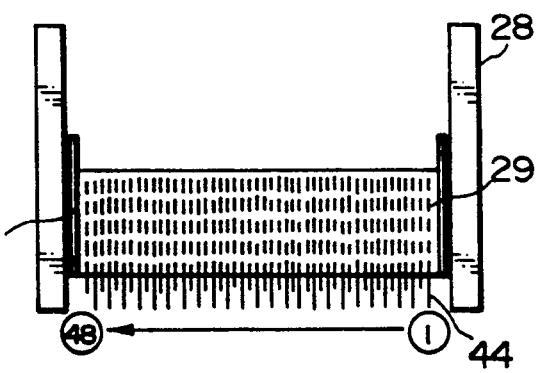

FIGS. 2A and 2B are plan views representative of essential portions of the card type integrated circuits having terminals consisted of respective arrays as described above. FIGS. 3A and 3B are plan views representative of essential portions of the connectors connected to the card type integrated circuits shown in FIGS. 2A and 2B, respectively. Further, FIGS. 2A and 3A show an 8-bit system, while FIGS. 2B and 3B show a 16-bit system.

As seen in the figures, in the 8-bit system card and the 16-bit system card there are formed terminal array 41 and 42 according to respective arrays of a pin assignment table shown in FIG. 1. Specifically, in the 8-bit system card, unused terminal Nos. 1-15, 8, 42, 44-48 have been deleted, while in the 16-bit system card all the terminals have been assigned.

In order to adapt the connector exclusively used for the 8-bit system card to every card, a contact pin No. 43 on the unused terminal of the connector is deleted like in case of the 8-bit system card, as if a method of making a 38-pole connector is used. In this way, the connector is made adaptable to the 8-bit system card.

Also, in order to make the connector adaptable to the 16-bit system card, the connector for the 16-bit system card is structured to have a contact pin No. 44 in the same array order as that of the 16-bit system card.

The unused terminals on the 8-bit system card type integrated circuit and the connector associated with the 8-bit system card type integrated circuit are deleted in the quantity of each 5 terminals from respective ends on the terminal sections so that stable connection can be achieved without collapsing the balance of the pressure applied on respective pins at the time of insertion.

Further, a card detecting signal (CD) is assigned to a pin No. 6 in common to the 8-bit system card and the 16-bit system card. Consequently, when a system using the 16-bit card system is controlled so as to disregard data on a "High" side (OE2 side), the 8-bit system card can be used even if it is inserted into the same throttle. Further, because there are provided with Vbb terminal and WE terminals (WE1 and WE2), ROM card and RAM card can be used by using the same throttle.

Figure 4:
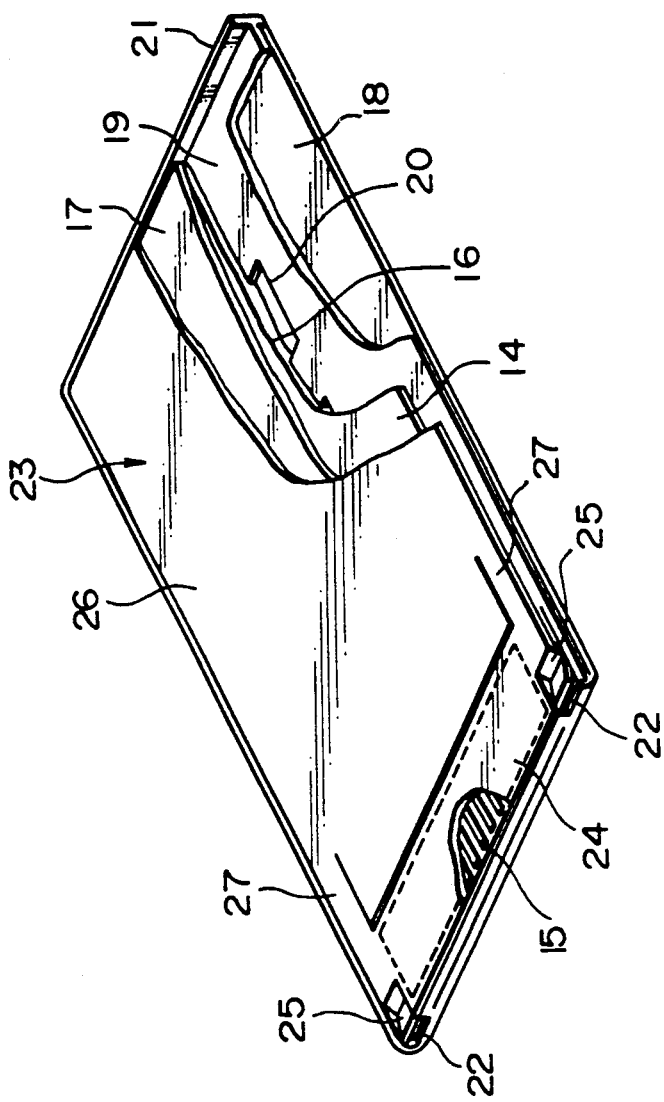
FIG. 4 is a partially broken perspective view showing the construction of the card type integrated circuit.
Figure 5:
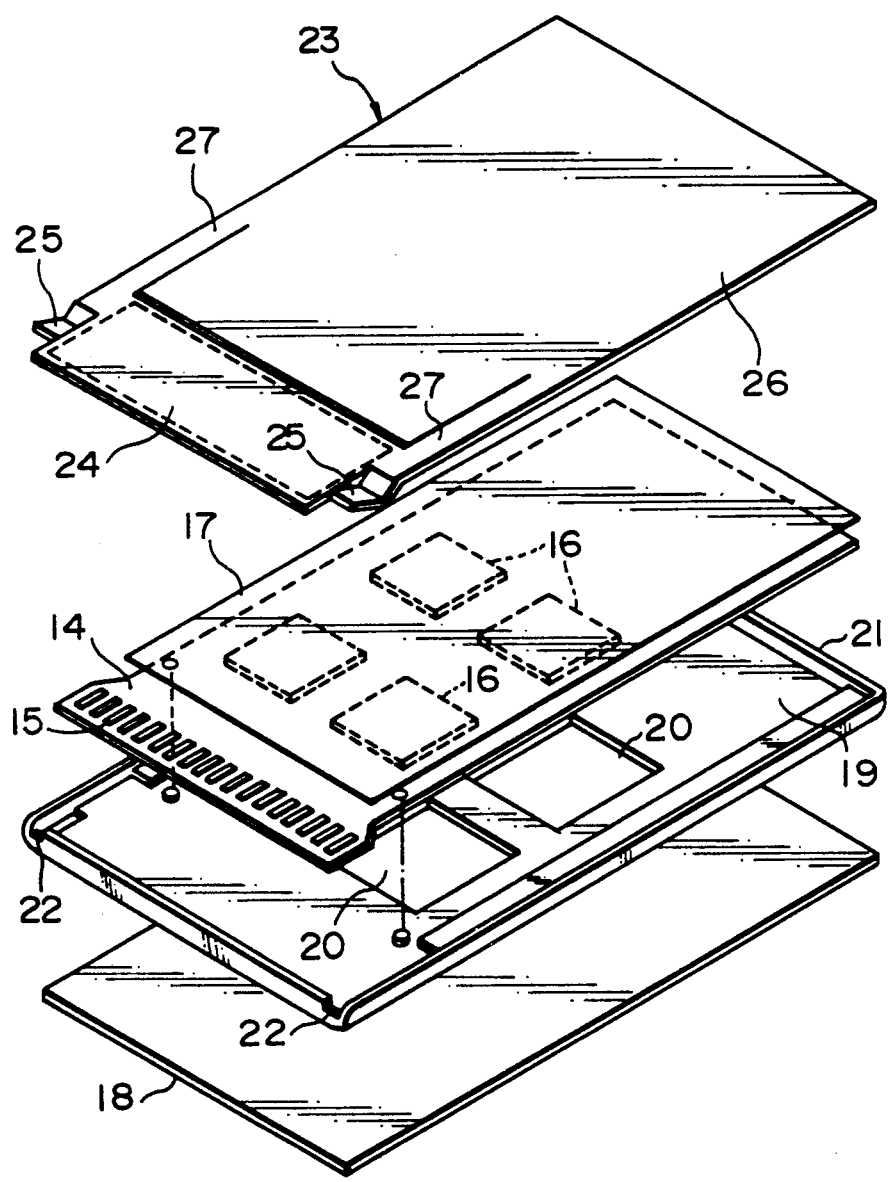
FIG. 5 is a disassembled perspective view showing the card type integrated circuit shown in FIG. 4.

Subsequently, construction of the card type integrated circuit will be described hereunder, making reference to FIGS. 4 and 5.

In the figures, a card edge type substrate 14 has on one end thereof a terminal section 15 for electrically connecting to a connector which will be described later, and is loaded with a circuit device 16, such as a memory, etc., on a predetermined position. The integrated circuit has an insulating film 17 in a size enough to cover the substrate 14 except the terminal section 15, and a rear cover 18.

The substrate 14 and the circuit device 16 are reinforced and protected by a frame 19 which has a recess hole 20 formed on a position associated with the circuit device 16. The frame 19 further includes on a perimeter portion thereof a standing edge 21 which surrounds the substrate 14, the rear cover 18 and a surface cover 23, is formed to be a predetermined height in the direction toward the increasing thickness, and is provided with notched portions 22 on both corner sections of the front end thereof.

The metallic surface cover 23 possesses a terminal protecting section 24 which covers the terminal section 15 of the substrate 14, receiving sections 25 formed in a V shape on both sides of the terminal protecting section 24, a circuit protecting section 26 which covers, except the terminal section 15, a circuit section covered with the insulating film 17, and leaf spring sections 27 which are formed on both sides of the circuit protecting section 26 to support the terminal protecting section 24. The metallic surface cover 23 is integrally pressed by using sheet metal to form a unit. The components described above are assembled in accordance with the steps below.

Firstly, the substrate 14 is fixed on one side of the frame 19 so that the circuit device 16 can fit in the recess hole 20. The insulating film 17 is fixed on the substrate 14 in a manner avoiding the terminal section 15, and then the rear cover 18 is adhered on the other side of the frame 19.

The circuit protecting section 26 of the surface cover 23 is positioned on the insulating film 17 and a part of the frame 19, while the terminal protecting section 24 and the leaf spring sections 27 are not fixed so as to be separatable from the substrate 14 and the terminal array 15.

The leaf spring sections 27 of the surface cover 23 are warped beforehand so that the terminal protecting section 24 can closely adhere to the terminal array 15 of the substrate 14. The leaf spring sections 27 further include a film similar to the insulating film 17, previously attached on the surface confronting the terminal protecting section 24 as shown with a broken line in FIG. 4. With this film an insulation between the terminal protecting section 24 and the terminal section 15 is kept. In this way, a card type integrated circuit is constructed.

Next, a connector to be connected to the card type integrated circuit described above will be explained hereunder, making reference to the drawings.

Figure 6:
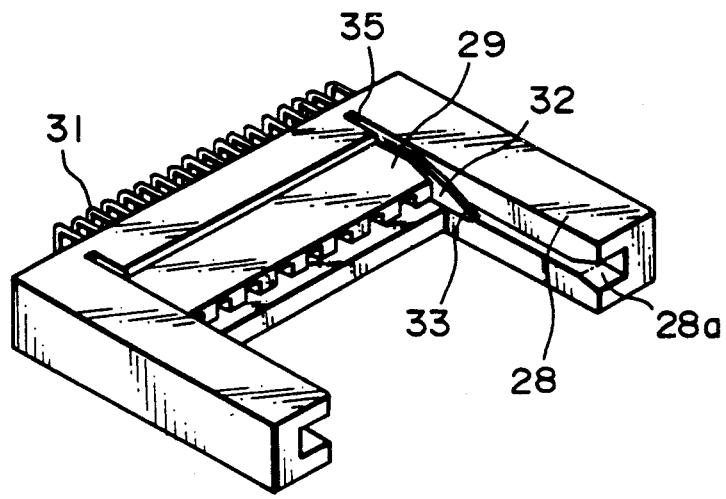
FIG. 6 is a perspective view showing the connector.
Figure 7:
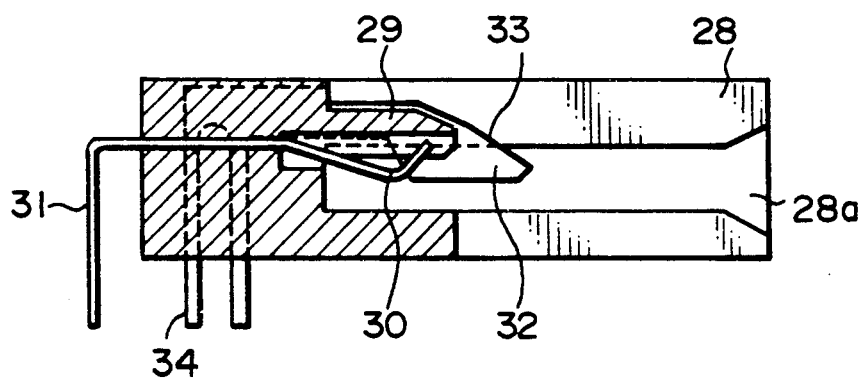
FIG. 7 is a sectional view showing a magnified essential portion of the connector shown in FIG. 6.
Figure 8:
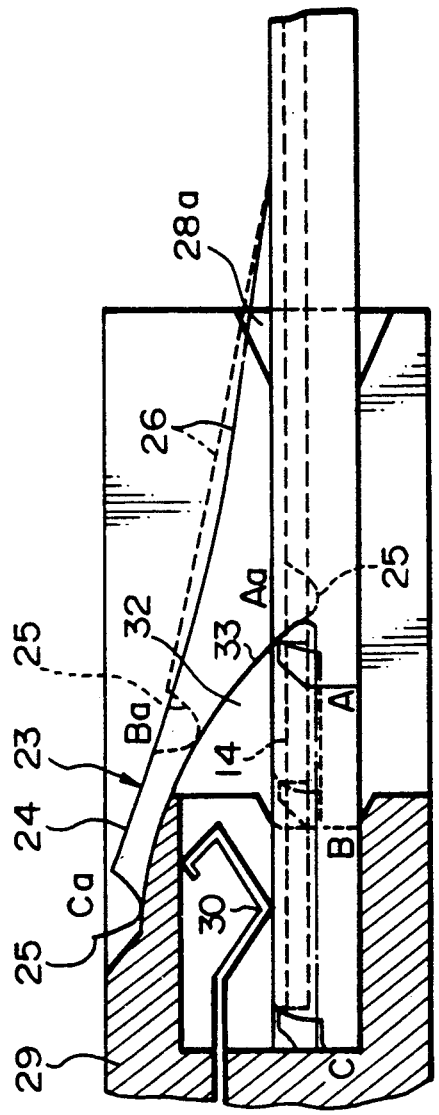
FIG. 8 is a sectional view of the connector connected to the card type integrated circuit.

FIG. 6 is a perspective view showing a connector.
FIG. 7 is a magnified sectional view representative of an essential portion of the connector shown in FIG. 6.
FIG. 8 is a sectional view showing an essential portion of the connector in a state of being connected to the card type integrated circuit.

As seen in the figures, the connector has a guide section 28 provided with a guide groove 28a for receiving the card type integrated circuit, and a housing section 29. The guide section 28 and the housing section 29 are formed as a solid body. In the housing section 29 there is shown a representative contact pin 30 positioned so as to associate with terminal 15 of the terminal array of the card type integrated circuit described above and also, out of the housing section 29 a contact pin 31 which is extended from the contact pin 30 protrudes so as to be connected to another substrate, not shown. The contact pin 30 is bent in the housing section 29 to work as a spring so as to contact terminal 15 of the terminal array when a card type integrated circuit is pressed into groove guide 28a.

The reference numeral 32 indicates a guide protrusion provided on the rear portion of the guide groove 28a. The guide protrusion 32 forms a slope 33 running from the upper surface of the housing section 29 down to the guide section 28 and is integrally connected to a ground terminal 34 on the side of the housing section 29.

To insert the card type integrated circuit into the connector having the structure mentioned above, the terminal array of the card type integrated circuit is first inserted into the guide groove 28a. When the card type integrated circuit reaches a predetermined position as shown in FIG. 8, the tip of the guide protrusion 32 of the connector gets in the notched portions 22 of the frame 19 and then strikes against the top end portions of the receiving sections 25 of the surface cover 23.

The receiving sections 25 which are bent to be formed into a V shape has the top end portion, as described above, associated with a slope 33 of the guide protrusion 32. Thus, when the card type integrated circuit is inserted further, the receiving sections 25 smoothly slide on the slope 33 while being pushed upward. As a result, the leaf spring sections 27 are warped upward to raise the terminal protecting section 24 to separate from the terminal 15 of the substrate 14.

When the card type integrated circuit is inserted more deeply into the connector, the contact pin 30 enters between the terminal array of the substrate 14 and the terminal protecting section 24 with the result that the contact pin 30 contacts the terminal 15 to complete the insertion of the card type integrated circuit into the connector. Electrical connection between the connector and the card type integrated circuit is completed when the tip of the card type integrated circuit strikes the innermost portion of the housing section 29.

Referring to FIG. 9, there is shown a configuration representative of specifications of a card type integrated circuit using an online bus system. In the figure, an interface connector 35 is a two-piece connector for connecting a card type integrated circuit to equipment at the connected side, such as a data processor, etc. A memory chip 36 which is connected to the interface connector 35 is a semiconductor memory device consisted of one or more semiconductors capable of loading memory chips, such as a RAM, a one-time PROM, a mask ROM, etc.

A backup battery 37 retains memory contents stored in a RAM card type integrated circuit. A power control circuit 38 is a control circuit which carries out switching operation of the power supplied from the respective equipment at the connected side. The power control circuit 38, thus, insures operation of a card type integrated circuit at the time of insertion and removal thereof while the power of the equipment at the connected side is turned on, thereby prevents malfunction that may occur when the power source voltage is in a transit state.

A write protect switch 39 writes data in a writable card type integrated circuit. The write protect switch 39 is so designed that a state of the switch 39 can be read out of the equipment at the connected side through an interface.

A control circuit/chip select circuit 40 is a circuit which selects respective chips when a control circuit, such as the above-mentioned write protect, and a plurality of memory chips are loaded on a card type integrated circuit.

FIG. 10 shows functions of an online bus system and a pin assignment table representative of assignment of terminals in an array of prior art.

In accordance with the prior art shown in FIG. 10, an 8-bit system card uses a connector having 34 poles in a single row pin, while a 16-bit system card requires a connector having 68 poles in a double row pin. Therefore, there is no compatibility between the cards. Consequently, it is necessary to prepare another connector applicable to the 16-bit system card, causing a remarkable increase in the cost.

On the contrary, in accordance with the present invention, a card type integrated circuit for the 8-bit system card and the 16-bit system card includes one or more circuit devices loaded on a substrate and a plurality of terminals connected to the circuit devices through an I/O bus system to input and output data from and to external equipment. A connector has a guide section provided with a guide groove for receiving the card type integrated circuit and a housing section provided with contact pins for connecting to the terminal array terminals of the card type integrated circuit. Since in the layout and assignment of the terminals of the card type integrated circuit and the contact pins of the connector, the terminals for signals common to the 8-bit system card and the 16-bit system card are arranged on l the central portion of the terminal array and the other terminals for signals dedicated to the 16-bit system card are arranged on the end portions of the terminal array, it is possible to use a single kind of connector in common for connecting to either of the 8-bit system card or the 16-bit system card according to the present invention.

Consequently, there is no need of separately forming a 16-bit system card having a configuration different from that of an 8-bit system card. In other words, since only a single kind of connector can be used for both cards, a remarkable cost reduction can be achieved.

Further, when the connector is used exclusively for the 8-bit system card, terminals unnecessary for the 8-bit system card can be removed as shown in FIGS. 2A and 3A, thereby it is possible to further reduce the cost.

As described above, even in the 16-bit system card circuit the 8-bit system card can be used thanks to the realization of compatibility. Further, 8-bit and 16-bit cards can be used in a common slot for a ROM card, and a RAM card used in respective bus systems. Consequently, an effect of construction enabling abundant variation of systems can be obtained.

In addition, when connecting a card edge having 48 terminals in accordance with the illustrative embodiment of the present invention, a card edge having pitches of 1 mm will suffice in respect to the size of a card type integrated circuit. When the memory capacity is required to be further increased, the number of terminals may be increased to more than 48 terminals. Simply considering face packaging components, such as a flat pack IC, etc., it is possible to use a card edge having a pitch size reduced to 0.65 mm. Also, according to the above calculation, nearly 70 terminals can be used. Where chips are available, there is no need to worry about the capacity.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A card type integrated circuit and respective 8/16-bit card connector compatible with 8-bit and 16-bit systems, wherein the card type integrated circuit comprises:

a substrate;

predetermined number of circuit devices disposed on the substrate, the circuit devices including memory;

a plurality of terminals arranged in a terminal array to be compatible with 8-bit and 16-bit systems in that terminals common to both 8 and 16 bit systems are disposed in a central portion of the terminal array and terminals associated with only a 16 bit system are symmetrically disposed at end portions of the terminal array, the terminal array being connected to said circuit devices through an I/O bus system for inputting and outputting signals from and to an external device via the card connector;

a surface cover having a separatable terminal protector formed thereon for protecting said plurality of terminals when not in use;

a backup battery for maintaining memory contents when external power is removed; and a control circuit for controlling operations of said card type integrated circuit;

and wherein the card connector comprises:

a pair of grooves for receiving said card type integrated circuit;

a connecting pin array having connecting pins corresponding to said plurality of terminals of said card type integrated circuit, for connecting to said plurality of terminals when said card type integrated circuit is received in said connector grooves, said connecting pins extending to an external portion of said connector for connection to an external device; and a protrusion for separating said terminal protector of said surface cover so that contact between said plurality of terminals and said connecting pin array can be made when said memory card is received by said pair of grooves.

2. A card type integrated circuit and 8/16-bit card connector in accordance with claim 1, wherein said circuit devices and said plurality of terminals are formed on the substrate; and wherein said card type integrated circuit is provided with a frame, said substrate being fixed to said frame and covered with said surface cover so as to protect said substrate and terminals.

3. A card type integrated circuit and 8/16-bit card connector in accordance with claim 1, wherein power and ground terminals and corresponding connecting pins are provided and wherein said terminal array is arranged symmetrically to the power and ground terminals.

4. A card type integrated circuit and 8/16-bit card connector in accordance with claim 1, wherein said memory includes ROM; and
   wherein a portion of said terminals are assigned as signal terminals exclusively for a RAM card type integrated circuit.

5. A card type integrated circuit and 8/16-bit card connector in accordance with claim 1, said card connector further comprising:

a guide section having a pair of guide grooves for guiding said card type integrated circuit when being received by said connector;

a housing section housing said connecting pins to be connected to said terminals of said card type integrated circuit; and wherein a portion of said connecting pins which are assigned to signals common to 8-bit and 16-bit systems are arranged on a central portion of the housing section and pins assigned to signals dedicated only to a 16-bit system are arranged at end portions of the housing section.

* * * * *